(12) United States Patent
Platt

(10) Patent No.: US 7,216,235 B1
(45) Date of Patent: May 8, 2007

(54) DRIVE/HOST LOCKING SYSTEM

(75) Inventor: David Platt, Mountain View, CA (US)

(73) Assignee: TiVo Inc., Alviso, CA (US)

( * ) Notice: Subject to any disclaimer, the term of this patent is extended or adjusted under 35 U.S.C. 154(b) by 1035 days.

(21) Appl. No.: 09/642,617

(22) Filed: Aug. 17, 2000

Related U.S. Application Data

(60) Provisional application No. 60/160,419, filed on Oct. 19, 1999.

(51) Int. Cl.
H04L 9/00 (2006.01)

(52) U.S. Cl. .................. 713/182; 713/164; 713/189

(58) Field of Classification Search ............. 713/182
See application file for complete search history.

(56) References Cited

U.S. PATENT DOCUMENTS

| | | | | |
|---|---|---|---|---|
| 5,327,563 A | * | 7/1994 | Singh | 713/193 |
| 5,448,045 A | * | 9/1995 | Clark | 235/382 |
| 5,533,125 A | * | 7/1996 | Bensimon et al. | 711/163 |
| 5,764,761 A | * | 6/1998 | Vicard | 713/189 |
| 5,850,443 A | * | 12/1998 | Van Oorschot et al. | 380/285 |
| 5,887,131 A | * | 3/1999 | Angelo | 713/202 |
| 6,108,785 A | * | 8/2000 | Poisner | 713/200 |
| 6,115,816 A | * | 9/2000 | Davis | 713/153 |
| 6,151,678 A | * | 11/2000 | Davis | 713/200 |
| 6,175,926 B1 | * | 1/2001 | Fogle | 713/202 |
| 6,268,789 B1 | * | 7/2001 | Diamant et al. | 340/5.74 |
| 6,370,649 B1 | * | 4/2002 | Angelo et al. | 713/202 |
| RE38,147 E | * | 6/2003 | Dawson et al. | 713/182 |
| 6,854,056 B1 | * | 2/2005 | Benantar et al. | 713/156 |

* cited by examiner

Primary Examiner—Nasser Moazzami
Assistant Examiner—Pramila Parthasarthy
(74) Attorney, Agent, or Firm—Kirk D. Wong; Hickman Palermo Truong & Becker LLP

(57) ABSTRACT

An authentication system for securing information within a disk drive to be read and written to only by a specific host computer such that it is difficult or impossible to access the drive by any system other than a designated host is disclosed. While the invention is similar in intent to a password scheme, it significantly more secure. The invention thus provides a secure environment for important information stored within a disk drive. The information can only be accessed by a host if the host can respond to random challenges asked by the disk drive. The host's responses are generated using a cryptography chip processing a specific algorithm. This technique allows the disk drive and the host to communicate using a coded security system where attempts to break the code and choose the correct password take longer to learn than the useful life of the disk drive itself.

20 Claims, 4 Drawing Sheets

DRIVE/HOST LOCKING SYSTEM

This application claims priority from U.S. Patent Application Ser. No. 60/160,419 filed Oct. 19, 1999.

FIELD OF THE INVENTION

The invention relates to a drive/host locking system which is an authentication system that allows only a desired host to have access to the information stored in a disk drive. More specifically, the invention relates to a system in which this authentication is performed through the use of a password used to unlock the disk drive, thereby providing access to information stored on the disk drive.

DESCRIPTION OF THE RELATED ART

Drive/host locking systems, are known in which a disk drive provides access to a specific host by use of a password security scheme. This type of security system prompts or challenges the host for a password and, once the correct password is supplied, the host gains access to all of the information stored on the disk drive. Using this type of interaction, two authorized computer systems can read and write information between each other in a totally secure environment without the threat of an unwanted host gaining access to the information.

When an outside source or host tries to access the information stored on a locked disk drive, the disk drive asks the host to supply the correct password.

This is also known as challenging the host. If the host supplies the correct password the disk drive becomes unlocked, and the host is allowed full access to all of the information on the disk drive.

To make prior art systems more secure, a system was provided that uses multiple passwords generated by an algorithm implemented by a cryptography circuit. Each password relates to a specific coded challenge asked by the disk drive. These coded challenges are asked at random and only give authorization to the host, which supplies the correct password.

Drive Host

One important aspect of drive/host locking systems is that when the disk drive is not in use, it is locked from all outside sources. When the disk drive challenges a host, and the host supplies the correct password, the disk drive becomes unlocked, giving the host full access to the disk drive. This gives the host the ability to read and write data to and from the drive. Once the host is finished accessing the disk drive, the disk drive is immediately locked again. This step is important in maintaining the security of the drive.

Security Authentication Password

As described above, for a host to gain access to the disk drive the host must be able to supply a correct password. S. Willens, *Network Access Control System and Process*, U.S. Pat. No. 5,889,958 (Mar. 30, 1999) demonstrates the importance of using a password to secure a connection between a host and a client computer. However, this type of security does not guarantee the extent of protection necessary to keep the stored information safe from undesired hosts. Eventually, to gain more security, disk drives were designed in which a plurality of challenges are randomly generated, in which only a specific one of the plurality of passwords from a desired host is allowed, depending on which one of a plurality of challenges is presented by the disk drive. An example of this authentication method is described by D. Platt, S. Lacey, T. Lae, and D. Adams in U.S. patent application Ser. No. 09/515,408 filed Feb. 29, 2000, *Apparatus and Method Capable of Restricting Access to a Data Storage Disk*.

With the growing use of technology breaking into coded password protection schemes is easier and much less time consuming. As described in K. Nemoto, *Secure Network Authentication Server Via Dedicated Serial Communication Path;* U.S. Pat. No. 6,032,259 (Feb. 29, 2000), it is well known in the art that there is a need for security when connecting between a host and a client computer to prevent invasion from an outside source.

M. Hellman, *Authentication using random challenges;* U.S. Pat. No. 5,872,917 (Feb. 16, 1999) also describes using a security method for a host computer accessing a disk drive. However, this authentication method uses multiple transactions between the host and the disk drive making this method very time consuming.

Cryptography Circuit

Eventually, systems were devised that require the host to prove that it knows the password without actually revealing the password, thus allowing the host to become secretly authorized without any unwanted hosts learning any information about the authorization password. These secret proofs of password knowledge are stored in circuits within the systems. These circuits, also known as cryptographic circuits, are located within the host, and store algorithms for generating the responses needed to authenticate a host secretly. Using a circuit such as the one described eliminates the host from having any access to the disk drive's information until after it has supplied the correct information to the disk drive.

SUMMARY OF THE INVENTION

Although this proof of password knowledge is a highly reliable security system, it is still not totally secure. Because these codes are pre-set, there is still only a finite number of codes, allowing a very persistent unwanted host, watching and learning, to have the ability to figure out the password.

As a result, yet another stronger form of cryptography was developed. This technique provides a new coded security system between the host and the disk drive, where attempts to break the code and choose the correct password or proof of password knowledge takes longer to learn than the useful life of the disk drive itself. This new coding algorithm between the host and the disk drive proves to be the most secure form of cryptography and is known as SHA-1, or Secure Hash Algorithm.

SHA-1 provides "high security" for the information stored within the disk drive. This algorithm is used by the host to generate complex responses needed to unlock the disk drive. SHA-1 also allows the disk drive and the host to communicate using much larger challenge and responses, making it infeasible to break the password security scheme.

Accordingly, it is an object of the invention to protect the stored information on the disk drive by providing a secure connection between the disk drive and the desired host.

It is another object of the invention to use an authentication system which allows the disk drive to determine if the confronted host is authorized to access the information stored on the disk drive.

It is still another object of the invention to use a password security scheme which allows the disk drive to challenge the host for a password response. This challenge is a challenge value and a lock value generated by the disk drive controller, and is one of a plurality of challenges which is chosen at random. This response is a response value generated by the host using an algorithm which is dependent on both the challenge value and the lock value generated by the disk drive controller.

It is yet another object of the invention to unlock the disk drive for an authorized host and give this host full access to all of the information stored on the disk drive. The disk drive then is locked again after the host has completed accessing the disk drive.

The invention also offers several advantages over previously known authentication schemes, particularly, challenge and response authentication schemes. The security of the authentication, based on the SHA-1 algorithm, is improved to secure completely the information stored on the disk drive, only allowing access to this information by an authorized host.

DETAILED DESCRIPTION OF THE INVENTION

A preferred embodiment of the invention and its advantages are better understood by referring to FIGS. 1–4 of the drawings, like numerals being used for like and corresponding parts of the accompanying drawings.

A security feature is provided that uses an authentication password to gain access to the information contained within a disk drive. This access is only granted to a host which can supply the correct password set. This password scheme has been carefully designed so as to never be repeated, therefore making it virtually impossible for an undesired host to gain access to the information stored within the disk drive. This password scheme uses much larger challenges from the disk drive, 512 bits for each challenged value such that it is never necessary to repeat the same challenge within the life span of the disk drive components. Thus, its possible that a single password is never repeated. The password scheme also uses a cryptography circuit for producing the password responses for, and depending on, the disk drive challenges. This technique allows the circuit to provide password response value of, for example 160 bits for each password response value, making it virtually impossible for an outside source to decipher the password algorithm. This cryptography circuit allows the host and the disk drive to communicate using a key while the disk drive is still locked and before any information is read off the disk drive itself.

Basic Overview

Figure 1:
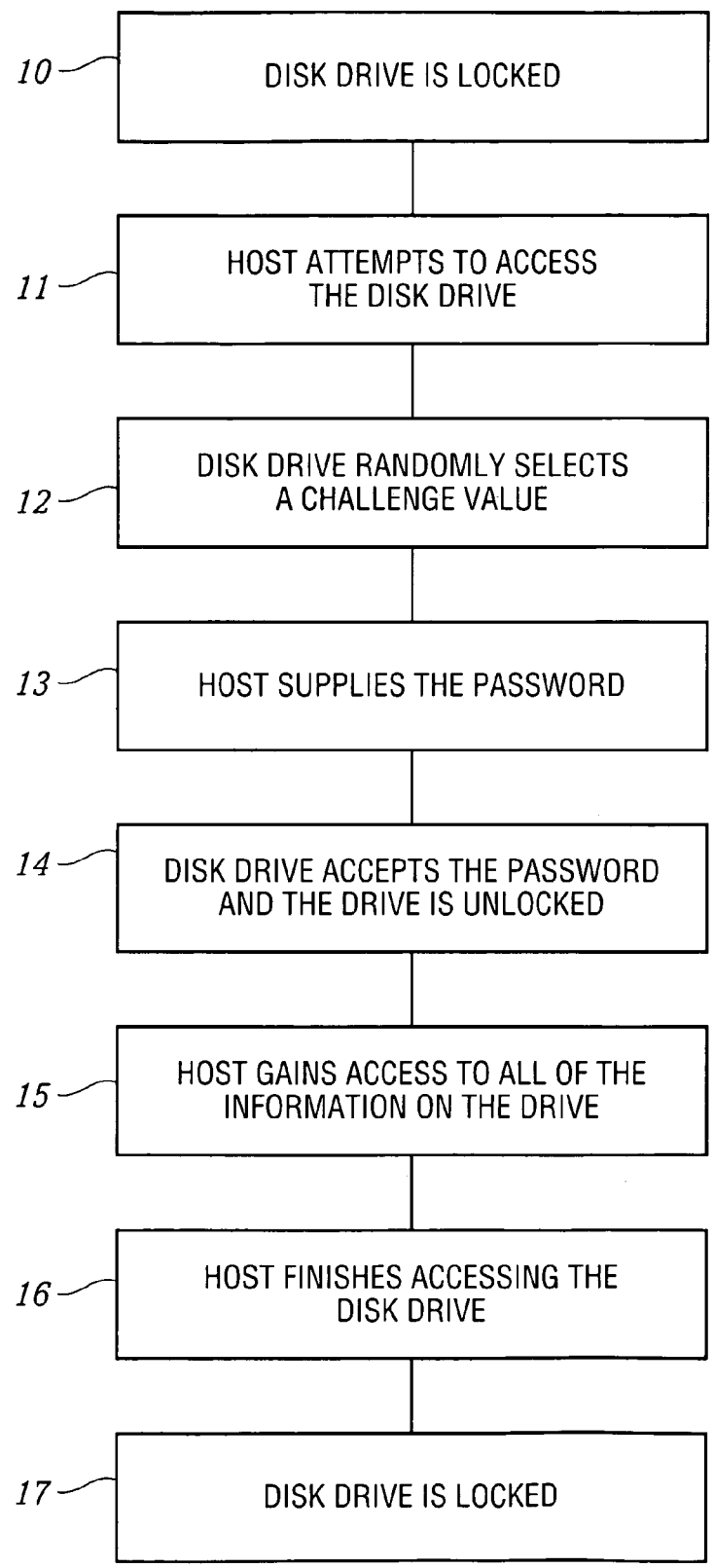
FIG. 1 is a flow diagram that illustrates the traditional procedure used when a desired host gains access to a disk drive.

The herein disclosed drive/host locking system allows only authorized users to have access to the drive system. This authorization is provided through the use of a disk drive challenge and a host authentication password, as shown in FIG. 1. It is known to have a disk drive locked to secure the valuable information from an outside source 10. When an outside source, or host, tries to access the information stored on the disk drive 11 the disk drive asks the host to supply the correct password. This is also known as challenging the host 12. The host then responds by generating a password 13. If the host supplies the correct password, the disk drive becomes unlocked 14, and the host is allowed to have access to all of the information on the disk drive 15. The host now has total access to the disk drive until it is finished accessing the information 16. Once the host's access to the disk drive's information is complete, the disk drive becomes locked again 17.

To make this system more secure, it is known to use multiple passwords, where each password relates to a specific coded challenge asked by the disk drive. These coded challenges are asked at random and only give authorization to the host which supplies the correct_password. However, because there are only a finite number of passwords and coded challenges, it was discovered that it is possible for an unwanted host to watch and learn the codes used to access the disk drive and attempt to gain access to the disk drive by continuously trying the learned passwords until one matches with the disk drive's coded challenge.

As a result, a system was devised in which the host proves that it knows the password without actually revealing the password. This allows a host to become secretly authorized without any unwanted hosts learning any information about the authorization password. These secret proofs of password knowledge are stored in circuits within the personal television device. These circuits, also known as cryptographic circuits, are located within the disk drive, and store the challenges and responses needed to authenticate a host. As in the technique described above, these challenges and response are also chosen at random to secure the system further.

Although this proof of password knowledge is a highly reliable security system, it is still not totally secure. Because these codes are pre-set, there are still only a finite number of codes. This allows a very persistent unwanted host, by watching and learning, to figure out the password.

Figure 2:
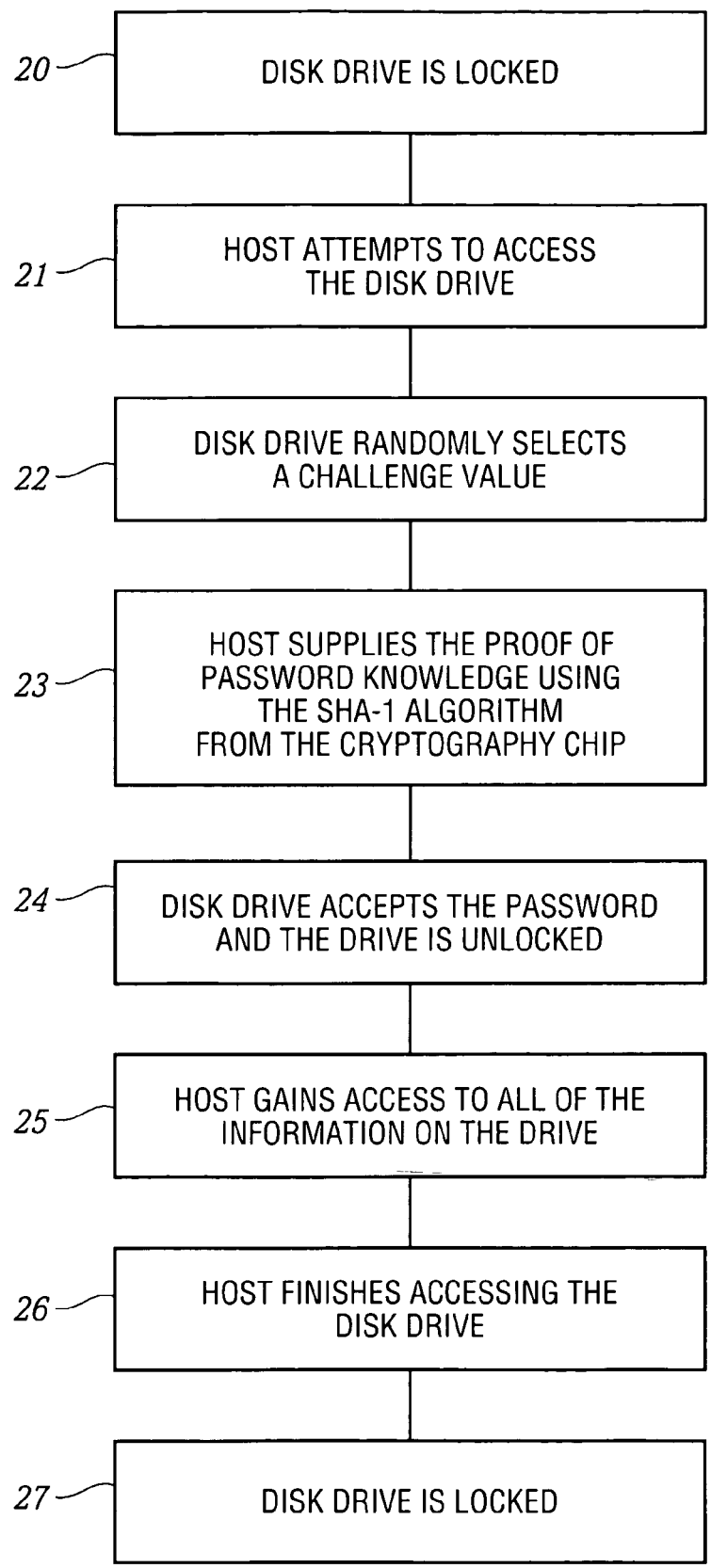
FIG. 2 is a flow diagram that illustrates a new procedure used when a desired host uses the SHA-1 algorithm to gain access to a disk drive according to the invention.

Referring now to FIG. 2, yet another stronger form of cryptography is shown. This technique provides a new coded security system between the host and the disk drive, where attempts to break the code and choose the correct password or proof of password knowledge take longer to learn than the life to the disk drive itself. This new coding algorithm between the host and the disk drive proves to be the most secure form of cryptography and is known as SHA-1, or Secure Hash Algorithm 23.

The password is never actually used, only the proof of password knowledge is used and that is enough to prove that the host is allowed to access the information on the disk drive. There is also only a single response to each challenge. The challenge is randomly generated by the disk drive controller, and the response is generated by using the SHA-1 algorithm on the cryptography chip. The disk drive controller is then able to implement the algorithm and verify the response, where this disk drive controller is secretly stored on a portion of the disk drive which is readable by the host, in flash memory or EEPROM.

The time used for this transaction is extremely quick. In the presently preferred embodiment of the invention, only takes a fraction of a second for the disk drive controller to implement the algorithm, and it takes a little over a half of a second for the host to generate the proof of password information.

The next step in this password identification authentication is for the disk drive to boot up unattended and for the host to supply the correct password for access to the disk drive without user intervention. Using this type of interaction, two authorized computer systems can read and write information between each other in a totally secured environment without the threat of an unwanted host gaining access to this information.

SHA-1

This drive/host locking feature is intended to provide a way to marry a disk drive and host computer in a way which makes the drive difficult or impossible to use in any system other than the designated host. This technique is similar in intent to a password scheme, but is significantly more secure.

A basic requirement of the invention is that both the drive controller and the host computer, or some peripheral attached thereto, are capable of storing a small amount of key information, roughly 1024 bits, executing a secure hashing algorithm (SHA-1), generating random numbers, and comparing two values. For adequate security, it is necessary that the key storage, and the calculation of the SHA-1 hash values be performed in a way which prevents the key information from being viewed or copied by an external user. Ideally, these functions are implemented in a physical secure cryptographic module, an integrated circuit or dongle, attached to, or integrated into, the host processor.

The password schemes used by drive/host locking systems are devised for the host to prove that it knows the password without actually revealing the password. This allows a host to become securely authorized without any unwanted hosts learning any information about the authorization password. These secret proofs of password knowledge are stored in circuits within the system. These circuits, also known as cryptographic circuits, are located within the disk drive, and store the challenges and responses need to secretly authenticate a host. As in the technique described above, these challenges and response are also chosen at random to secure the system.

Also, yet another stronger form of cryptography is disclosed. This technique provides a new coded security system between the host and the disk drive, where attempts to break the code and choose the correct password or proof of password knowledge take longer to learn then the life to the disk drive itself. This new coding algorithm between the host and the disk drive proves to be the most secure form of cryptography and is known as SHA-1, or Secure Hash Algorithm.

In SHA-1 cryptography, the host is not allowed any access to any of the disk drives information until the host gains the proper authentication. Also, in the past there were a fixed, or finite, set of challenged values. However, in the SHA-1 cryptography, the challenge values are so large that these challenge values never have to be repeated. This technique allows for an extremely large number of proofs of password knowledge response values.

Figure 3:
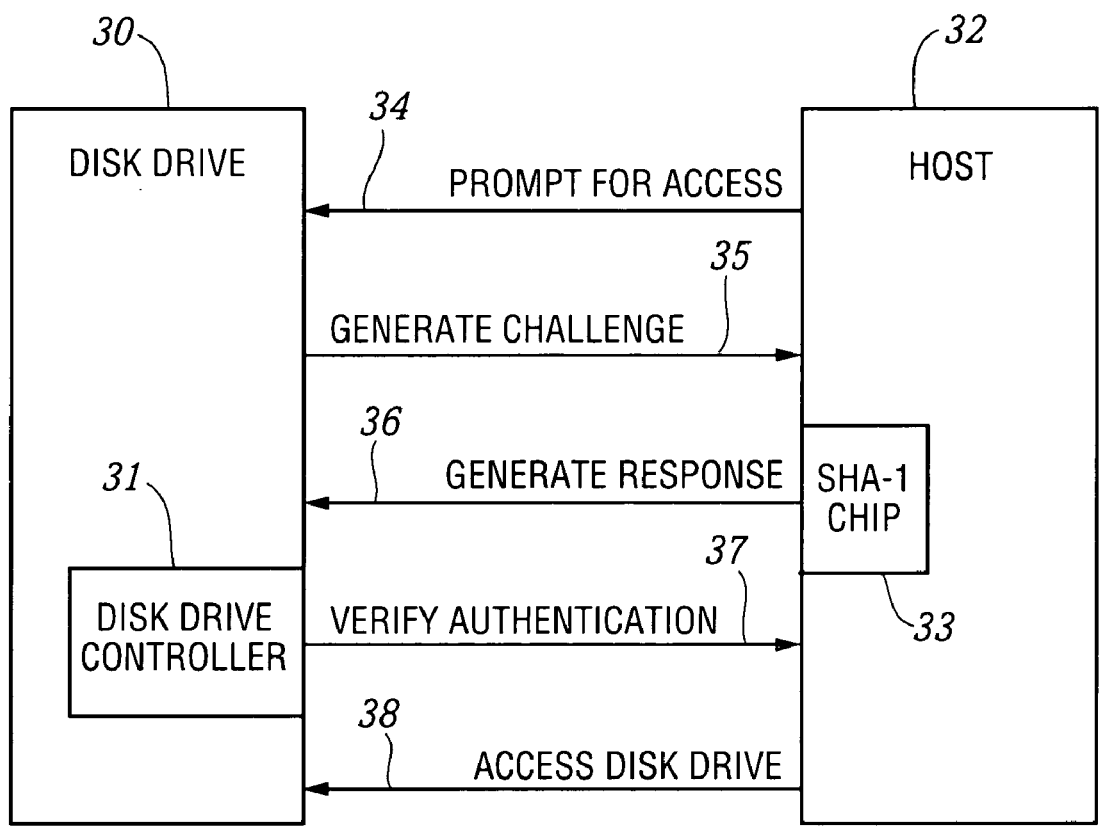
FIG. 3 is a block diagram that illustrates communication between the disk drive and the host during authentication according to the invention.

FIG. 3 illustrates the communication between a disk drive and a host. The drive/host system's basic requirement is that both the drive controller and the host computer, or some peripheral attached thereto, are capable of storing a small amount of key information (roughly 1024 bits in the presently preferred embodiment of the invention). On the disk drive 30, a disk drive controller 31 is used for generating random challenges and comparing response values. On the host 32, a cryptography chip 33 is used to XOR challenge and lock information and to run the SHA-1 algorithm on this information to produce a response value. For adequate security, it is necessary that the key storage, and the calculation of the SHA-1 hash values, be performed in a way which prevents the key information from being viewed or copied by an external user.

The first step is for the host to confront the disk drive 34. Immediately, the disk drive generates a random challenge 35 for the host to prove its authentication. The host then computes the response 36, or proof of password value, using the SHA-1 algorithm and the cryptograph chip 33. The chip uses two inputs, the challenge and the lock values (512 bits each). An XOR function, and the SHA-1 algorithm are used to combine these two inputs to generate a 160 bit proof of password response value. Then the disk drive verifies the proof of password response value 37 to determine whether or not the host is allowed access to the information. If the hash values do not match, the drive controller rejects the command, reporting an authentication error to the host. If the hash values do match, the drive controller allows access to the host 38 by unlocking the drive—switching it either to the unlocked for data state (if the data-access key was used) or to the fully unlocked state (if the key-change key was used).

The host computer (or its cryptographic module) must calculate the appropriate authentication response. It does so by choosing one of the two drive keys it knows (data-access or key-change) and computing the value:

A=SHA (challenge XOR key)

The random challenge value and the specified key are XORed in a bit wise fashion, and then are passed as input to the standard SHA-1 Secure Hash Algorithm, described in detail in *Secure Hash Standard*, Federal Information Processing Standard 180-1, National Institute of Standards and Technology (Apr. 17, 1995). The entirety of which is incorporated herein by reference. The output of the hashing algorithm consists of a 160 bit hash value.

SHA-1 is defined in a way which permits it to accept any number of bits as input. It performs its calculations on one or more blocks of 64 bytes (512 bits). In the normal version of the algorithm, the input data is padded out to a multiple of 512 bits by appending a 1-bit, a variable number of 0-bits, and then a 64-bit field giving the number of bits of input prior to the padding.

If it is desirable to use this standard implementation, then the drive locking algorithm uses keys and random challenge values of 55 bytes (440 bits). These are the largest values which can be processed in one 64 byte SHA-1 input block after the standard padding and length encoding are performed. The appropriate padding and encoded length are appended to the (key XOR challenge) value prior to the calculation of the SHA-1 hash.

It is equally possible to use a slightly nonstandard version of SHA-1, which dispenses with the padding and length encoding. In this algorithm, the keys and random challenge values are 512 bits long, and no padding is performed. This approach is preferable, because it simplifies the implementation slightly. The lack of interoperability between this particular SHA-1 variant and the standard form of SHA should not be an issue.

SHA-1 uses 32 bit fixed point arithmetic internally, and is defined in a way consistent with network byte order, big-endian, representation of integers. If implemented on a little-endian processor (for example, Intel CPUs), it is necessary to byte swap the integer values at the beginning of processing, and to byte swap the resulting 160 bit output value.

Because the SHA-1 algorithm is so complex, there is no need to abort the authentication process from a specific host. For example, there is no need to abort the authentication process if a specific host generates three wrong passwords.

Commands

Figure 4:
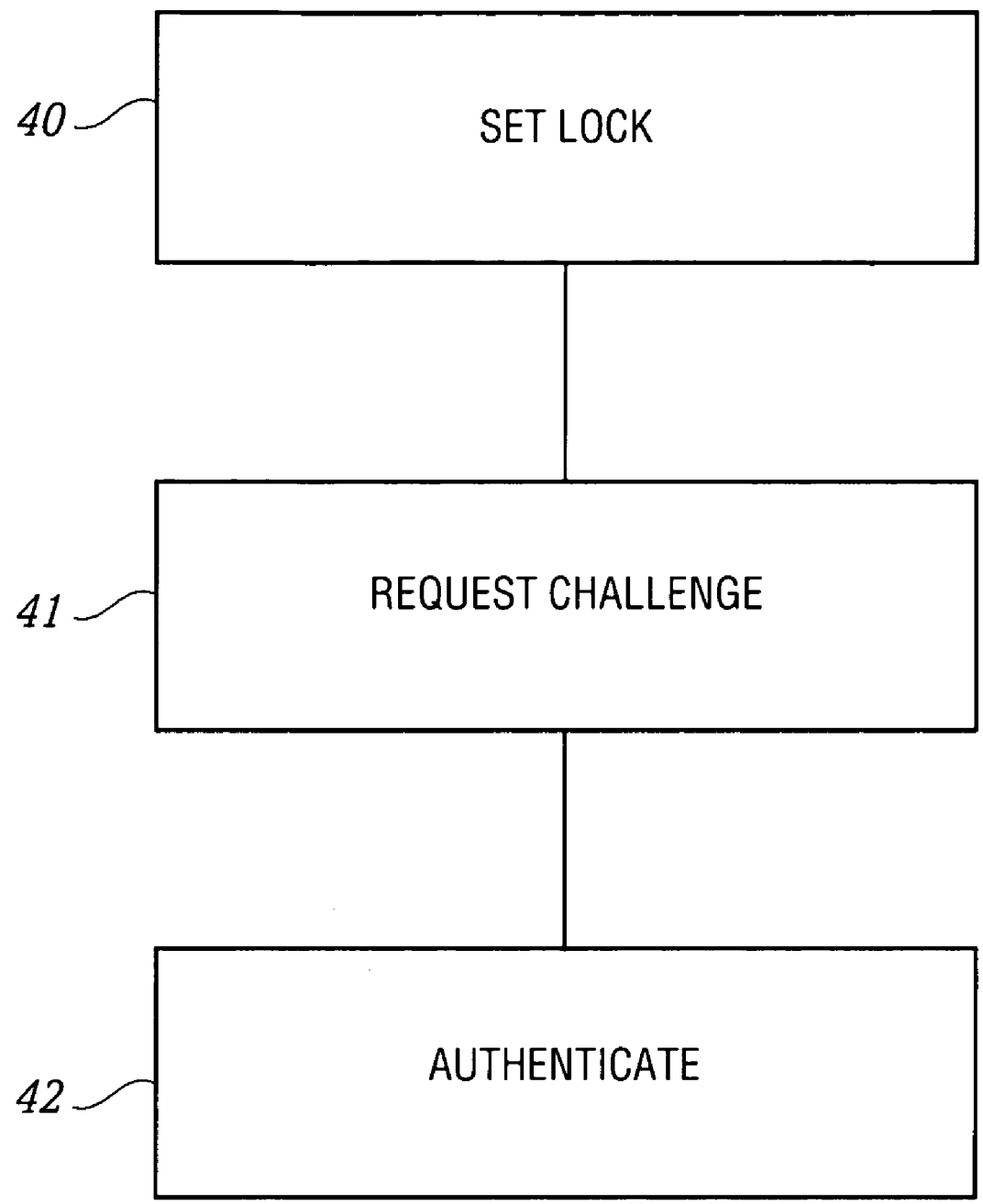
FIG. 4 is a flow diagram that illustrates commands that are used to ensure a secure drive/host locking system according to the invention.

Referring now to FIG. 4, the preferred embodiment of the invention adds three new commands: SET LOCK, REQUEST CHALLENGE, and AUTHENTICATE.

The SET LOCK command 40 is used to set or clear either the drive-access of key-change key. The key being set or cleared is identified by a single bit in one of the IDE drive control registers, e.g. LSB of the head number. The command expects to receive one sector (512 bytes) of data through the IDE data FIFO. Only the first 512 bits of this data are significant; the remaining bits are reserved and must be zero. This command is accepted only if the drive is fully unlocked. The drive controller stores the 512-bit key in a reserved area of the disk.

When the drive is powered up or reset it checks the two 512-bit keys. If both of the keys are zero (all 0 bits), the drive is placed in locked state. If either key is nonzero, the drive is placed in the locked state. The drive also generates a 512-bit random number, and stores this random number in some convenient location.

When the drive is in a locked state, the host computer must issue a REQUEST CHALLENGE command 41. This command causes the drive controller to return one sector (512 bytes) of data containing the 512-bit random number calculated at power-up/reset padded out to 512 bytes with zeros.

The host computer now issues an AUTHENTICATE command 42. It identified the key it used to calculate the hash value (again, using one bit in one of the IDE drive control registers) and writes one sector (512 bytes) of data through the IDE and DIDO. This sector of data consists of the 20 bytes (160 bits) of SHA-1 hash valued, padded out with zero bytes.

The drive controller retrieves its copy of the key specified by the host and performs the same SHA-1 calculation described above. It then compares the hash value it calculated with the hash value contained in the data sent by the host in the AUTHENTICATE command 42. If the hash values do not match, the drive controller rejects the command, reporting an authentication error to the host. If the hash values do match, the drive controller unlocks the drive, switching it either to the unlocked for data state (if the data-access key was used) or to the fully unlocked state (if the key-change key was used).

Keys

The preferred embodiment of the invention creates a pair of keys that are known to the drive controller and to the host's cryptographic module. This first key is used to gain access to the drive; the second is used to gain the right to change the keys. At any given moment, the drive is in one of three states: locked (contents cannot be read or written and the keys cannot be changed), unlocked for data (contents can be read and written, but the keys cannot be changed), or fully unlocked (contents can be read and written, and the keys can be changed). If the drive is in the locked state, all commands intended to read and write data to/from the drive are rejected.

There are two keys used in this device both used to unlock and lock the disk drive. The first key is known as the functionality key. The functionality key is located in the receiver's chip and is used to unlock the disk drive when the disk drive challenges the host and the host supplies the correct password. The second key is the master key, or skeleton key. This key is not found within the receiver's chip. It is kept only with the products designers and programmers. The skeleton key is used to manually unlock and/or lock the disk drive. This is used in instances when the programmer needs to access the disk drive to enter or change information specific to the individual disk drive. This is used on disk drives that either need to be specially modified, upgraded, or need special trouble shooting.

Although the invention is described herein with reference to the preferred embodiment, one skilled in the art will readily appreciate that other applications may be substituted for those set forth herein without departing from the spirit and scope of the present invention. Accordingly, the invention should only be limited by the claims included below.

The invention claimed is:

1. A computer implemented method for providing access between a first party and a second party, said method comprising the steps of:
   generating a challenge value using a disk drive controller at said first party;
   transmitting said challenge value to said second party;
   generating, using a secure hash algorithm, a response value using a combination of a lock value and said challenge value at said second party;
   wherein said lock value indicates a desired access mode;
   transmitting said response value to said first party, wherein said disk drive controller receives the challenge and lock value; and
   validating said response value by said first party, wherein said validating step further comprises:
      computing a duplicate response value on said disk drive controller by performing a duplicate secure hash algorithm;
      comparing said response value to said duplicate response value; and
      granting said second party access to said first party in accordance with the desired access mode indicated by the lock value if the response and duplicate response values match.

2. The method of claim 1, wherein said first party is a disk drive and said second party is a host computer.

3. The method of claim 2, wherein said disk drive is locked when not accessed.

4. The method of claim 1, further including:
   using 512 bits for said challenge value and using 512 bits for said lock value.

5. The method of claim 1, further including:
   randomly generating said challenge value.

6. The method of claim 1, wherein said step of generating said response value further includes:
   using an exclusive OR (XOR) to combine said challenge and said lock value.

7. The method of claim 1, wherein said step of generating said response value further includes:
   using 160 bits for said response value.

8. The method of claim 1, wherein said step of generating said response value further includes:
   using a cryptography circuit to generate said response value.

9. The method of claim 8, wherein said step of generating said response value further includes:
   using an algorithm to generate said response value.

10. The method of claim 3, wherein step of granting said second party access to said first party further includes:

unlocking the disk drive in accordance with the desired access mode indicated by the lock value if the response value is valid.

11. An apparatus for providing access between a first party and a second party, said apparatus comprising:
    means for generating a challenge value using a disk drive controller at said first party;
    means for transmitting said challenge value to said second party;
    means for generating, using a secure hash algorithm, a response value using a combination of a lock value and said challenge value at said second party;
    wherein said lock value indicates a desired access mode;
    means for transmitting said response value to said first party, wherein said disk drive controller receives the challenge and lock value; and
    means for validating said response value by said first party, wherein said validating means further comprises:
        means for computing a duplicate response value on said disk drive controller by said disk drive controller executing a duplicate secure hash algorithm;
        means for comparing said response value to said duplicate response value;
        means for granting said second party access to said first party in accordance with the desired access mode indicated by the lock value if the response and duplicate response values match.

12. The apparatus of claim 11, wherein said first party is a disk drive and said second party is a host computer.

13. The apparatus of claim 12, wherein said disk drive is locked when not accessed.

14. The apparatus of claim 11, further including:
    means for using 512 bits for said challenge value and using 512 bits for said lock value.

15. The apparatus of claim 11, further including:
    means for randomly generating said challenge value.

16. The apparatus of claim 11, wherein said means for generating said response value further includes:
    means for using an exclusive OR (XOR) for combining said challenge and said lock values.

17. The apparatus of claim 11, wherein said means for generating said response value further includes:
    means for using 160 bits for said response value.

18. The apparatus of claim 11, wherein said means for generating said response value further includes:
    a cryptography circuit for generating said response value.

19. The apparatus of claim 18, wherein said means for generating said response value further includes:
    an algorithm for generating said response value.

20. The apparatus of claim 13, wherein said means for granting said second party access to said first party further includes:
    means for unlocking the disk drive in accordance with the desired access mode indicating by the lock value if the response value is valid.

* * * * *